July 25, 1961  G. LORY  2,993,278
AREA MEASURING INSTRUMENT
Filed April 1, 1955  2 Sheets-Sheet 1
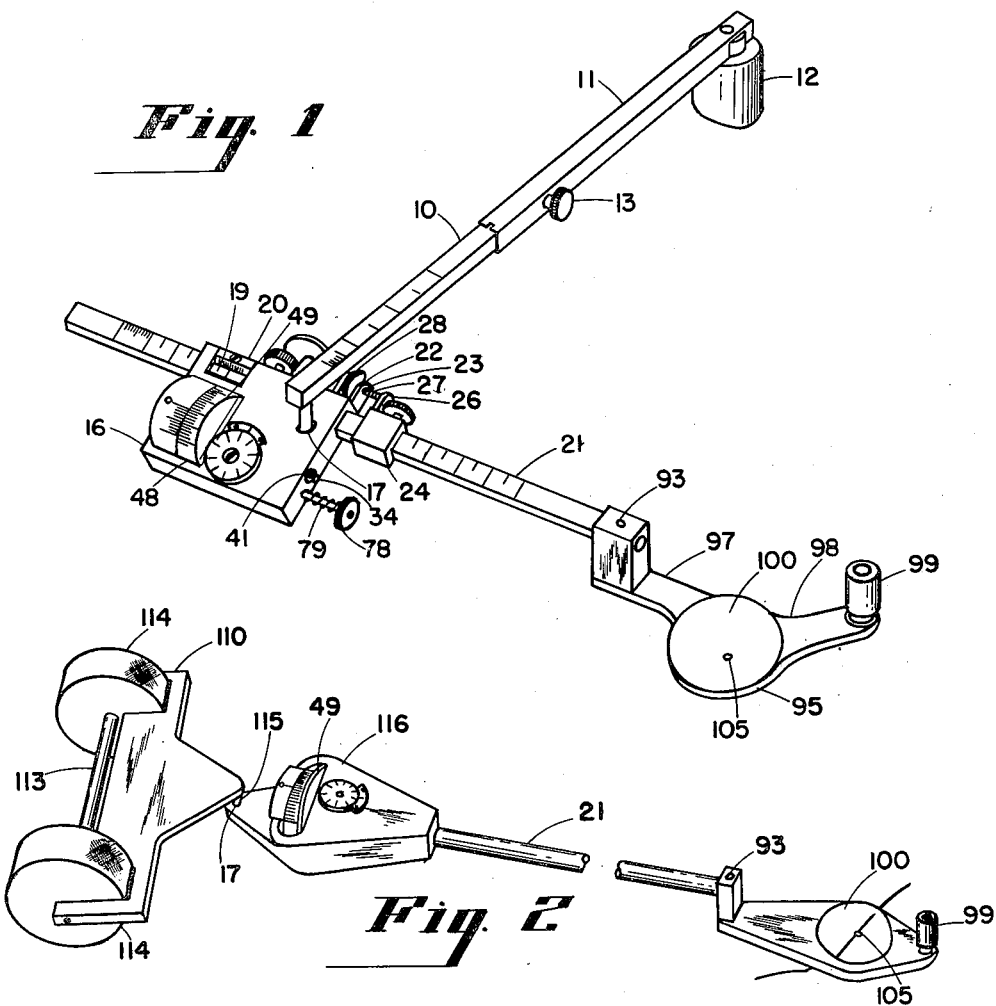
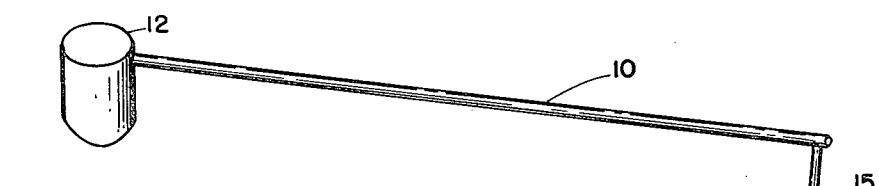
INVENTOR.
GEORGE LORY
BY
J. F. Cuneo
ATTORNEY

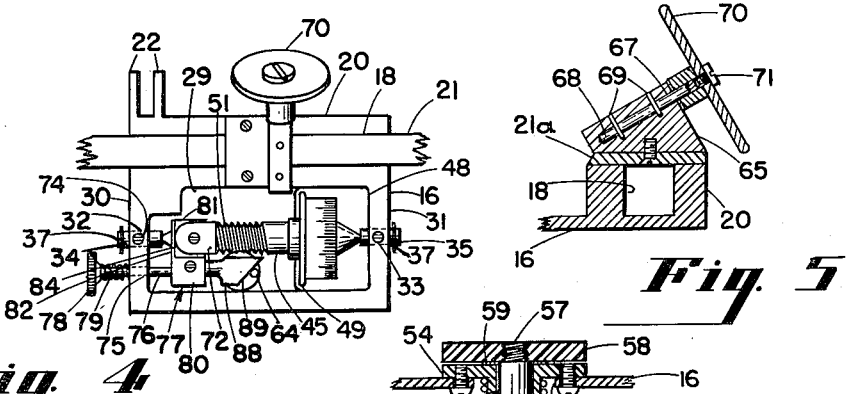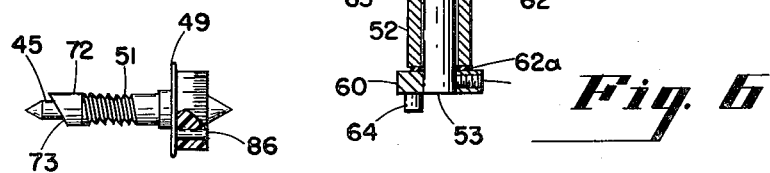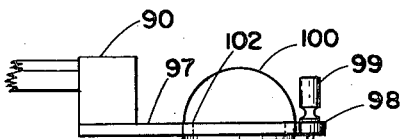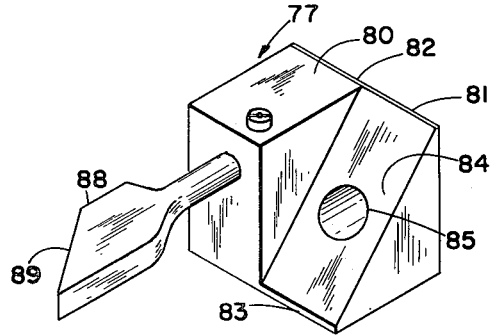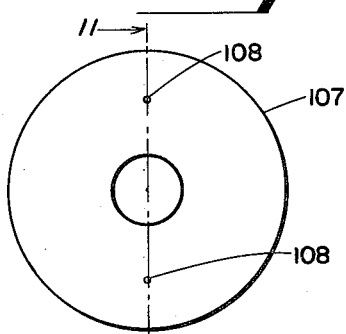

United States Patent Office 2,993,278
Patented July 25, 1961

2,993,278
AREA MEASURING INSTRUMENT
George Lory, 2134 Redcliff, Los Angeles, Calif.
Filed Apr. 1, 1955, Ser. No. 498,563
2 Claims. (Cl. 33—122)

This invention relates to area measuring instruments of the class of planimeters and in particular to a polar planimeter having novel features and improved construction.

The majority of planimeters currently available require that the operator position his eye at a point substantially above the indicator devices to read the instrument. It becomes considerably more difficult to read the instrument when the area that is measured is located, by necessity, a substantial distance from the operator.

Conventional planimeters also generally employ a pointed tracer to follow the line bounding the area to be measured. When this area is irregular or quite large, the operator may experience considerable difficulty in keeping the point of the tracer on the line at all times because his hand, which guides the tracer point, will be continuously obstructing the operator's view of the point and the chart. To overcome this difficulty the operator must frequently alter his position while operating the instrument. Conventional planimeters also require that at the start of each operation a record be kept of the then existing reading. This value is subsequently subtracted from the final reading to obtain the correct figure.

Rolling planimeters have been employed to measure long areas, however, all existing embodiments of this type of planimeter have been constructed so that the tracer arm can sweep only a limited angle on either side of the center line, usually not more than 30°, which limits the usefulness of the instrument and requires additional operations.

It is a purpose of this invention to provide an improved planimeter constructed to make it possible for the operator to quickly and easily return the dial and measuring wheel scales to zero at the beginning of each operation, thus making the planimeter direct reading.

Another purpose of the invention is to provide a planimeter having an improved optical tracer device wherein the lens of the device is not substantially surrounded by an obstructing mounting as has been the case with previous optical tracer assemblies. My improved optical tracer is designed to afford the operator a convenient view of the tracer mark and the line to be followed from numerous angles without having to shift the position of his eyes. The optical tracer is also constructed so that the tracer mark and line does not become obstructed from view by the hand of the operator as it guides the tracer mark.

A further purpose of this invention is to provide an improved planimeter body construction that enables the observer to conveniently and quickly read the dial and measuring wheel as well as the vernier, without the necessity of stretching over the chart to position his eyes where he can correctly read the indicators, as has been heretofore necessary.

An added purpose of this invention is to provide an accurate and simple calibrating device suitable for rapidly checking the accuracy and adjustment of the instrument.

A related purpose is to provide a planimeter of the rolling planimeter type, capable of measuring areas of any length, the planimeter being constructed to permit the tracer arm to sweep an angle of 90° on either side of the center line.

To accomplish the above purposes I provide an improved planimeter equipped with a zero setting mechanism for quickly and positively returning the measuring wheel and dial to zero position. The mechanism is actuated by a lever parallel to the shaft of the measuring wheel, when the lever is pushed in the dial and measuring wheel are returned to zero regardless of their position and remain locked in zero position as long as the lever is depressed. When the lever is released the dial and measuring wheel are free to turn as the tracer mark moves on the boundary of the area to be measured.

My improved planimeter also includes a novel tracer assembly comprising a highly curved convex lens that is provided with a tracer mark on the lower planar surface of the lens that comes in contact with the surface of the area to be measured. The lens is hemispherical and makes the tracer mark and line to be followed, easily visible from a wide range of positions. The lens is mounted in a support secured to the end of the tracer arm. The support is equipped with a handle that is offset to one side of the lens and positioned rearwardly from the tracing axis described by the axis of the pole and tracer point when the planimeter body is mounted on the pole arm. This positions the hand of the operator behind the lens and provides a clear view of the lens. Since the tracer mark is just above the line on the area to be measured, the optical system is free from parallax so long as the images are viewed from a position within the cone of vision of the lens.

Another feature of my improved planimeter is the tilted body construction which places the measuring wheel and dial at an angle from which they can be easily read. The body member is provided with a support on the far side that raises the rear portion of the body, that is the portion away from the operator, and causes the forward portion to almost touch the surface. The lower edge of the measuring wheel acts as a second point of support.

When the planimeter is required to measure areas that extend in length beyond the span of the conventional pole arm and tracer arm combined, I provide a rolling carriage planimeter of improved design and construction. The carriage is provided with a pole that pivotally seats in the pole socket of the planimeter body. The rolling carriage comprises preferably a platform having two wheels of equal diameter rotatably supported by it. The equivalent diameter of the wheels causes the carriage to roll in a straight line and slipping is avoided by the weight of the carriage. I further place the pole at a position on the carriage, and the pole socket in the planimeter body so that the tracer arm is permitted to describe an angle of 90° on each side of the center line without interfering with the carriage as has heretofore been the case, where the angle described by the tracer arm was sometimes limited to not more than 30° on each side.

The above and additional features of my novel planimeter construction will be more clearly understood with reference to the following detailed description and accompanying illustrative drawings in which:

FIG. 1 is an isometric view showing my improved planimeter with an optical tracer, tilted body member, and zero setting mechanism.

FIG. 2 is an isometric view of an improved form of rolling planimeter according to this invention.

FIG. 3 is an isometric view of a conventional pole anchor, arm and pole.

FIG. 4 is a plan view looking at the bottom of the planimeter body including the zero setting mechanism and body tilting member secured to the bottom of the body.

FIG. 5 is a view partly in cross section of the body tilting member shown in FIG. 4.

FIG. 6 is a view partly in cross section showing one construction of the dial mechanism with a zero setting device, and the manner in which the dial assembly is mounted to the body member.

FIG. 7 is a side plan view of a measuring wheel shaft with a zero setting sleeve in position, partly cut away to show the weight.

FIG. 8 is an isometric view of a sliding block including a dial resetting blade, and showing the ported inclined face for cooperating with the zero setting sleeve of FIG. 7.

FIG. 9 is a side plan view of the lens support, wide angle lens and tracer support handle that is secured to the end of the tracer arm, forming the tracer point assembly.

FIG. 10 is a top plan view of a calibrating disc.

FIG. 11 is a cross section view of the calibrating disc taken on the line 11—11, of FIG. 10, including the surface engaging pins.

Referring to the drawings in which similar reference characters designate similar parts throughout, there is shown in FIG. 1 an isometric view of my novel area measuring instrument, showing a polar means consisting of the conventional pole arm pivotally connected to body member 16. The polar means may be either the conventional pole arm shown in FIGS. 1 and 3 or it may be a pole secured to a rolling carriage as shown in FIG. 2. A conventional pole means comprises a pole arm 10, which may be either fixed or may be adjustable as represented in the drawing. Adjustable pole arm 10 slides in sleeve 11 which is secured at one end to pole anchor 12. The pole anchor locates one end of the arm with respect to the surface of the area that is to be measured and allows the other end to describe a circle about the fixed point. The pole arm is locked in the sleeve by means of a set screw 13. The polar means of either type include a depending pole having a ball 15 at the lower end which makes a pivotal connection with the planimeter body member.

Body member 16 of the planimeter is provided with a pole socket 17, located at the appropriate position on the body. The axis of the socket is normal to the surface to be measured for area when the body member is pivotally connected to polar ball by the socket and the measuring wheel and tracer point rest on the surface.

Body member 16 is preferably provided with a longitudinal groove 18 that extends the entire length of the body and is parallel to side 20. The groove extends preferably from the lower surface of the body and is deep enough to accommodate the tracer arm 21 which is preferably square in cross section. The tracer arm may be either fixed or adjustable as shown in FIG. 1. A tracer arm retainer 21a encloses a portion of groove 18 and permits the tracer arm to slide in the groove. If the tracer arm is adjustable, body member 16 is provided with a rectangular opening 19 which extends between the upper surface of the body member and the groove. The margin of the body member surrounding opening 19 is preferably provided with an index mark and vernier to permit correct positioning of the tracer arm with respect to the body member.

Body member 16 is provided with a bifurcated extension 22 that projects from side 20. Both ears of extension 22 have a bore 23, the axes of the two bores falling on a straight line parallel to side 20 of the body member. A clamping sleeve 24 adapted to slidably envelope the tracer arm is locked to the arm by set screw 25 which is threaded into clamping sleeve 24. Sleeve 24 is provided with a projecting ear 26 that extends from clamping sleeve 24 in the same direction as the ears of extension 22.

One end of a threaded shaft 27 is secured to projection 26 and is located to permit the shaft to pass through both bores 23 when the tracer arm is in place in body member 16. A threaded adjusting wheel 28, thick enough to fit snugly between the ears of extension 22 is threaded on shaft 27 as it is inserted into bores 23. When the clamping sleeve is locked in place on the tracer arm it is possible to accurately adjust the position of the body on the tracer arm by simply turning the adjusting wheel.

The central portion of the body member is preferably hollowed to form a cavity 29 that extends from the lower surface of the body to within a short distance from the upper surface. The length and width of the cavity are proportioned to leave a suitable margin surrounding the cavity. End margins 30 and 31 are provided with bores 32 and 33 at corresponding positions in the opposite margins. Bearings 34 and 35 are proportioned to fit snugly in the bores to form a sliding fit. The outer ends of bearings 34 and 35 are preferably provided with an annular groove or slot 37. A second pair of threaded bores are placed adjacent the bearing bores and screws 41 and 42 are threaded therein. These screws are provided with integral flanges near their outer end that are large enough in diameter to seat in slots 37. Turning the screws thereby controls the longitudinal position of the respective bearing.

Measuring wheel shaft 45, having suitable pointed ends is rotatably supported between bearings 34 and 35 and when the distance between the bearings is correct, the shaft will rotate freely and the bearings are locked in position by means of set screws 46. A measuring wheel 49 is supported by shaft 45, and adjoining the measuring wheel there is a graduated scale on the outer circumferential surface of an annulus mounted on shaft 45.

Body member 16 is provided with an opening 48, preferably rectangular in outline, that extends between the upper surface of the body member and the cavity. The opening is positioned to permit all portions of the measuring wheel and scale to clear the body member when the measuring wheel shaft is properly supported between the shaft bearings. A vernier is secured to the body member adjacent the indexed scale of measuring wheel 49.

Measuring wheel shaft 45 is provided with worm 51 on that portion of the shaft that is opposite the graduated scale from the measuring wheel. The worm may be an integral part of the shaft or it may be secured to the shaft by a set screw or key as desired. Worm 51 engages a worm gear 52 that is rotatably supported by a shaft 53 which is in turn rotatably supported by body member 16.

The construction of the worm gear assembly is illustrated in detail by FIG. 6. This comprises a thrust plate 54 that is preferably secured to the upper surface of body member 16 by means of screws or other suitable attaching means. The thrust plate covers an opening 55 which is positioned to permit worm gear 52 to mesh with worm 51 on measuring wheel shaft 45. Thrust plate 54 is provided with a bore 56 of suitable diameter to permit shaft 53 to rotate freely but snugly therein.

The upper end of shaft 53 is provided with a threaded portion 57 on which is threaded dial 58; the dial being graduated and having a zero mark. Shaft 53 is equipped with a thin integral flange 59 that adjoins the inner end of threaded portion 57. This flange rotates against the surface of thrust plate 54 when the shaft is seated in bore 56. A coil spring 63 is placed around shaft 53 below thrust plate 54. A washer 62 is placed on shaft 53 adjoining the lower end of coil spring 63. Worm gear 52, having a bore to permit it to rotate on shaft 53, is placed on the shaft against washer 62. A second washer 62a is placed on the shaft and against the lower end of worm gear 52 and the assembly is held on the shaft by a retainer collar 60 that is secured to the lower end of the shaft by a set screw 61. An eccentrically positioned reset pin 64 extends from collar 60 and is parallel to shaft 53. The spring exerts force against the worm gear and washers forcing them against the collar and permitting the worm gear, collar shaft and dial to rotate together as a unit unless the worm gear is subjected to a greater restraining force than that exerted by the spring combined with the frictional drag between the parts.

The area measuring device also includes means for supporting the body member at an angle with the surface to be measured for area and thereby makes the dial and measuring wheel scale easier to read. This means may be any suitable type of surface contact member that is capable of raising one side of the body member while lowering the opposite side, and not interfere with the travel of the lower surface of the measuring wheel over the surface to be measured for area. In the drawings this is shown as a tapered mounting block 65 secured by screws or other suitable means to tracer arm retainer plate 21a. Mounting block 65 is provided with a bore 67 that supports axle 68. Axle 68 is secured to tapered mounting block by pins 69 and extends at an angle to body member 16 from side 20. A supporting roller 70 is rotatably secured to the end of axle 68 by a large headed screw 71. The roller may be made of sufficient diameter to raise the side of the body member the desired degree and permit the body member to slope toward the operator. The supporting means may also be a surface contacting member capable of sliding over the surface to be measured, such as for example a hemispherical contact surface mounted on the end of a suitable extension connected to the lower surface of the body member.

The zero setting mechanism is shown in FIGS. 4, 6, 7 and 8, and comprises an annular sleeve 72 having a bore corresponding in diameter to that of measuring wheel shaft 45. Sleeve 72 is truncated at one end to form a sloping elliptical surface 73, that is inclined at an angle less than 90° with the longitudinal axis of the shaft; the preferred angle being 60°. Truncated sleeve 72 is secured to shaft 45 by any suitable means such as a set screw 74, and is located on the shaft between worm 51 and the end of the shaft supported by bearing 34, with inclined elliptical surface 73 facing the bearing. End margin 30 of body member 16, that supports bearing 34, is provided with a bore 75 located preferably between bearing 34 and the forward side of body member 16; the axis of bore 75 being parallel to the axis of shaft 45. A plunger rod 76 having a diameter corresponding to that of bore 75 slides snugly in the bore. A sliding block 77 is secured to the end of plunger rod 76 that extends into the cavity of the body member. The opposite end of the plunger rod is provided with a pressure plate 78, preferably circular in outline. Both the pressure plate and sliding block are preferably secured to the plunger rod by threads. A helical compression spring 79 is placed on plunger rod 76 between the body and the pressure plate and normally holds the sliding block in contact with the inner surface of margin 30.

Sliding block 77 comprises preferably a supporting portion 80 having one surface suitable for making sliding contact with the bottom of cavity 29 when the sliding block is mounted on the plunger rod. The width of supporting portion 80 is such that it avoids contact with the shaft or sleeve 72 at all times. Supporting portion 80 is provided with an extension 81 that projects from the supporting portion toward the measuring wheel shaft. Extension 81 reaches slightly beyond the far edge of the circumference of sleeve 72. Surface 82 of extension 81 is preferably parallel to the inner surface of margin 30 and normally rests against this surface when the plunger rod is not depressed. When in this position end 83 of lateral extension 81 extends longitudinally into cavity 29 to a point just short of the outer end of sleeve 72. Surface 84 of extension 81, connecting end 83 and the edge of surface 82, is sloped at an angle corresponding to that of elliptical surface 73. Extension 81 is ported with a longitudinal hole 85 that is large enough in diameter and is positioned to afford unmolested passage to the end portion of the measuring wheel shaft and its supporting bearing. Since extension 81 does not normally extend to sleeve 72 and port 85 surrounds the measuring wheel shaft, the measuring wheel is free to rotate as long as extension 81 is not moved inwardly from margin 30. When the plunger rod is depressed, the inclined surface of sleeve 72 is placed in contact with inclined surface 84 and the resulting cam action will bring the two faces in full contact with each other at the time the plunger rod has been fully depressed. The angular position of the truncated end of sleeve 72 can be adjusted so that the measuring wheel will be returned to zero whenever the two inclined surfaces are in full contact.

It is possible that at some position the inclined elliptical surface would be angularly positioned to engage the surface 84 at dead center, thereby preventing the cam action from taking place. This is avoided by loading the measuring wheel with an eccentrically positioned weight 86, that will cause the measuring wheel shaft to come to rest, when the measuring wheel is raised off the surface and the body member is in its normal position, at an angular position at which dead center engagement cannot occur.

Sliding block 77 is also provided with a finger-like extension ending in a flat blade 88. Blade 88 is provided with a horizontal edge 89 that slopes at an angle with the axis of the plunger rod. The slope and length of the edge is sufficient to permit it to contact reset pin 64 extending from collar 69, at some position as it travels forward regardless of the angular position of the reset pin. As the inclined edge moves forward with sliding block 77, the reset pin comes in contact with slanting edge 89 and will slide along the inclined edge and will advance, causing the dial shaft to turn until inclined surfaces 73 and 84 are in full contact. The distance of blade 88 from sliding block 77 is adjustable as shown in the drawings and can be set to cause the shaft to rotate so that the dial will read zero at the point of full advance.

By the zero setting means described it is apparent that both the measuring wheel and dial can be returned to zero from any position they may be in by simply depressing the plunger rod.

The end of the tracing arm of the area measuring instrument is provided with a novel tracer arm assembly comprising, a bracket 90 that is mounted on the end portion of the tracer arm, which is preferably cylindrical and enters a corresponding bore in the bracket. The bracket is secured to the end of the tracer arm by means of a set screw 93 that may be tightened when the bracket is in position. A tracer lens housing is secured to the lower end of the bracket by any suitable means such as screws, soldering or welding. The lens housing comprises a circular annulus 95 having extensions 97 and 98 projecting from the outer edge. The extensions are separated by an angle that is less than 180° but greater than 90°. Extension 97 is secured to bracket 90 and extension 98 is provided with a handle 99. Extension 98 and handle 99 are positioned rearwardly of the axis passing through the pole and the tracer point or mark. The shaft which supports handle 99 extends through extension 98, and since extensions 97 and 98 do not have their lower surfaces coextensive with the lower surface of annulus 95, but are positioned above the lower surface of the annulus, the shaft is extended to the position of the lower surface of annulus 95 and provides a support that prevents the tracer from tipping when pressure is placed on the handle by the hand of the operator.

A highly curved convex lens 100 of the wide angle type of lens, has a planar surface 101 and is provided with an annular shoulder 102 that corresponds in diameter to the inner diameter of annulus 95 and is deep enough to permit the planar surface to reach the lower edge of annulus 95. The lens rests in the annulus and the curved upper portion is not obstructed in any way by the annulus or other form of retainer as is usually the case in optical tracers previously devised. The curved portion of the lens is hemispherical.

Planar surface 101, that comes in contact with the surface to be measured for area, is provided with an index point or mark 105 located at the center of the planar surface. Since the surface to be measured for area and the mark are substantially in the same plane, parallax is reduced to a minimum and will not cause errors in reading. The wide angle properties of the lens permit the operator to view the tracer point and the boundary line of the area to be traced, from any position within the cone of vision of the wide angle lens.

When the instrument is in use, the surface of the lens provided with the tracer mark, the contact edge of the support, where one is employed, the lower hardened steel edge of the measuring wheel, and the extending end of the handle shaft provide four points of support for the instrument, and position the body member at an angle with the surface placing the side nearest the operator just out of contact with the surface.

A thin annular calibrating disc 107, of predetermined diameter, resembling a flat washer, is provided with two pin points 108 located at diametrically opposed points, preferably equidistant from the outer circumference of the disc. The disc is employed by pinning it on a flat surface and placing a reference mark alongside the disc that will be passed by the tracer mark. The shaft of the handle of the tracer assembly is unscrewed until it is flush with the lower surface of extension 98. Annulus 95 is placed in contact with the outer circumference of the calibrating disc with the tracer mark on the reference line. The annulus is kept in contact with the disc at all times and the tracer assembly is revolved around the disc until the tracer mark again rests on the reference mark. Since the area measured by the tracer mark is known, provided the annulus has been kept constantly in contact with the disc, it is easy to check the adjustment of the instrument, and if the measurement shown on the measuring wheel does not check with the known area, the instrument can be adjusted until the reading is correct.

In some cases the area to be measured may be quite long and extend considerably beyond the distance that can be reached by the tracer arm and pole arm of the ordinary planimeter. Such area must be divided into a number of areas and each measured separately if the usual plainmeter is to be used. The rolling planimeter shown in FIG. 2, may be used to measure areas of any length. The planimeter comprises a carriage platform 110 which supports an axle 113 and is provided with recesses in which wide rollers 114 of equal diameter, secured at either end of axle 113, can rotate. The rollers can be knurled to prevent them from slipping on a smooth or glazed surface. The forward portion of platform 110 is provided with an extension that is preferably triangular in outline and centrally located between the two rollers. A downwardly extending pole 115 is secured near the point of the triangular extension. The pole seats in a pole socket located in body member 116 of the planimeter. This pole socket is located on the side of the body that is opposite the tracer point from the measuring wheel. By placing the pole and socket as described, the tracer arm is permitted to describe an angle of 90° on either side of the center line while the carriage is traveling either forward or backward. This allows the tracer arm to cover the maximum area.

While the planimeter carriage shown in FIG. 2, is made horizontal, any other suitable form may be employed. Likewise the body member of the planimeter is shown in the conventional flat position for convenience, however, this body may be tilted and may be provided with a zero setting mechanism like the planimeter shown in FIG. 1, if desired.

The improvements may all be combined in an area measuring instrument, as shown in FIG. 1, or the improvements may be used singly or in combination as required.

Various alterations may be made in the details of construction without departing from the scope of the present invention as defined by the following claims.

I claim:
1. In an area measuring instrument the combination of a body member; means to support the body member above a surface including polar means pivotally connected to the member and supported from the surface in spaced relationship to the member; tracing means extending from the member in a direction opposite from the polar means and having a supporting portion spaced from the member; a measuring wheel rotatably mounted in the member and adapted to rollingly contact the surface, said measuring wheel being located between the position where the polar means pivotally connects to the member and the tracing means; said polar means including a carriage means having roller means rotatably secured thereto, said carriage means being provided with a pivotal connection for pivotally engaging the body member in spaced relationship to the carriage means, said pivotal connection being positioned on a line normal to the axis of the roller means and removed from said axis a distance sufficiently greater than the radius of the roller means to enable said body member to be freely turned to either of two positions 180° apart and parallel to said axis.

2. In an area measuring instrument the combination of a body member; means to support the body member above a surface including polar means pivotally connected to the member and supported from the surface in spaced relationship to the member; tracing means extending from the member in a direction opposite from the polar means and having a supporting portion spaced from the member; a measuring wheel rotatably mounted in the body member and adapted to rollingly contact the surface, said measuring wheel being located between the position where the polar means pivotally connects to the member and the tracing means; said polar means including a carriage means having roller means rotatably secured thereto, said carriage means being provided with a pivotal connection for pivotally engaging the body member in spaced relationship to the carriage means, the pivotal connection on the body member being at a point proximate the measuring wheel, said pivotal connection being positioned on a line normal to the axis of the roller means and removed from said axis a distance sufficiently greater than the radius of the roller means to enable said body member to be freely turned to either of two positions 180° apart and parallel to said axis.

References Cited in the file of this patent
UNITED STATES PATENTS

| 579,224 | Stedman | Mar. 23, 1897 |
| 672,581 | Willis | Apr. 23, 1901 |
| 931,774 | Krueger | Aug. 24, 1909 |
| 1,058,148 | Buvinger | Apr. 8, 1913 |
| 1,142,182 | Krippendorf | June 8, 1915 |
| 1,260,486 | Van Meter | Mar. 26, 1918 |
| 1,900,332 | Coradi et al. | Mar. 7, 1933 |
| 2,674,042 | Ott | Apr. 6, 1954 |

FOREIGN PATENTS

| 811,622 | Germany | Aug. 23, 1951 |

OTHER REFERENCES

Keuffel & Esser Co., Hoboken, N.J., Catalog, 38th edition, 1936, page 341. (Copy in Div. 66.)

Frederick Post Co., Chicago Catalog, 18th edition, 1936, pages 201–203. (Copy in Design Div.)

Eugene Dietzgen Co., Chicago, Catalog, 15th edition, 1946, page 241. (Copy in Design Div.)

Publication, Filotecnica Salmoiraghi, Milan, "Optical Planimeter Model 236," received in Patent Office June 13, 1952, 2 pages.

Eugene Dietzgen Co., Chicago, Catalog 77S, 1953, page 155. (Copy in Design Div.)